United States Patent
Imada et al.

(10) Patent No.: US 7,337,461 B2
(45) Date of Patent: Feb. 26, 2008

(54) CATV SYSTEM PROVIDED WITH A DIGITAL BROADCASTING RECEIVING UNIT AND A BILATERAL REMOTE CONTROLLER

(75) Inventors: Hiroshi Imada, Yawata (JP); Norifumi Sata, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 11/010,446

(22) Filed: Dec. 14, 2004

(65) Prior Publication Data

US 2005/0155078 A1    Jul. 14, 2005

(30) Foreign Application Priority Data

Jan. 8, 2004    (JP)    ............................. 2004-002721

(51) Int. Cl.
*H04N 7/173*    (2006.01)
*H04N 7/16*    (2006.01)

(52) U.S. Cl. .................. 725/120; 725/133; 725/141; 725/153

(58) Field of Classification Search ................ 725/133, 725/141, 153, 120; 348/734
See application file for complete search history.

(56) References Cited

U.S. PATENT DOCUMENTS

| | | | | |
|---|---|---|---|---|
| 6,097,441 | A * | 8/2000 | Allport | 348/552 |
| 6,407,779 | B1 * | 6/2002 | Herz | 348/734 |
| 6,505,348 | B1 * | 1/2003 | Knowles et al. | 725/49 |
| 2001/0020297 | A1 * | 9/2001 | Inoue | 725/39 |
| 2002/0154157 | A1 * | 10/2002 | Sherr et al. | 345/716 |

FOREIGN PATENT DOCUMENTS

JP    10-271359    10/1998

* cited by examiner

*Primary Examiner*—Kieu-Oanh Bui
(74) *Attorney, Agent, or Firm*—Wenderoth, Lind & Ponack, L.L.P.

(57) ABSTRACT

A digital broadcasting transmitting unit multiplexes a content exclusively used for remote controller in addition to contents of programs A and B and transmits the multiplexed contents. A digital broadcasting receiving unit separates the multiplexed contents and transmits the content exclusively used for remote controller to a bidirectional remote controller. The bidirectional remote controller displays the received content exclusively used for remote controller on a display thereof.

12 Claims, 5 Drawing Sheets

CATV SYSTEM PROVIDED WITH A DIGITAL BROADCASTING RECEIVING UNIT AND A BILATERAL REMOTE CONTROLLER

BACKGROUND OF THE INVENTION

1. Field of the Invention

The present invention relates to a CATV system equipped with a digital broadcasting receiving unit and a bidirectional remote controller.

2. Description of the Background Technology

The BS digital broadcasting and CS digital broadcasting of recent years have been multi-channeled, and data broadcasting service such as electronic program guides (hereinafter, "EPGs") used so that a viewer can select a desired program from many broadcast programs, weather forecast and news besides the programs has been in practical use.

Further, in the CATV system, the programs of the BS digital broadcasting and CS digital broadcasting have been remultiplexed, and pay-TV programs such as video-on-demand broadcasting (hereinafter, "VOD broadcasting") have been broadcast. Thus, it has become possible for viewers to watch various broadcastings by carrying out a remote control while viewing a television screen.

Such a prior art CATV system is described with reference to FIG. 5. FIG. 5 is a block diagram showing a construction of the prior art CATV system. In FIG. 5, identified by 1 is a digital broadcasting transmitting unit, by 2 a CATV transmission line, by 3 a digital broadcasting receiving unit (hereinafter, "STB"), by 4 a television receiver and by 5 a bidirectional remote controller for conducting a desired operation to the STB 3.

The digital broadcasting transmitting unit 1 multiplexes contents of general broadcast programs, data broadcasting services such as EPGs, and the VOD broadcastings into a plurality of transport streams, and each transport stream is transmitted as a carrier wave to the STB 3 via the CATV transmission line 2 after being digitally modulated.

The STB 3 is provided with a transmission function of separating a target content from the multiplexed contents and transmitting it to the television receiver 4. A viewer operates the bidirectional remote controller 5 to control the STB 3, whereby a desired program or various pieces of service information can be watched on the television receiver 4.

Further, a digital broadcasting receiving system disclosed in Japanese Unexamined Patent Publication No. H10-271359 is, for example, known as a system having the same functions as the above CATV system. In this digital broadcasting receiving system, electronic program information obtained by a digital broadcasting receiving unit is displayed on a display of a bidirectional remote controller and the digital broadcasting receiving unit is controlled based on this display.

However, in the former CATV system, it was not possible to simultaneously receive a general broadcast program and a broadcasting of a different channel not related to this general broadcast program, i.e., a VOD broadcasting, if the STB 3 is equipped with only one tuner. Thus, if the viewer tries to watch the VOD broadcasting, he is obliged to select a channel of the service information (list of titles of movies, what's new information and screen used to purchase the movie, etc.) set for the VOD broadcasting, a channel of a movie preview broadcast screen or the like and to switch from the general broadcast program being watched to the display screen of the television receiver 4.

Further, if the STB 3 is equipped with a plurality of tuners, it is possible to simultaneously display the screen of the VOD broadcasting of a channel different from the broadcast program being watched as a picture-in-picture screen within the screen of the television receiver 4 or to display it on the display of the bidirectional remote controller 5. However, the service information of the VOD broadcasting having an information capacity corresponding to the general broadcast program is difficult to confirm when being displayed on the picture-in-picture screen or on the display of the bidirectional remote controller 5. As a result, the display screen of the television receiver 4 needed to be switched to a similar state by, for example, switching the general broadcast program being watched to the display on the picture-in-picture screen. These points also hold true for the latter digital broadcasting receiving system, which has similar problems accordingly.

SUMMARY OF THE INVENTION

An object of the present invention is to provide a CATV system capable of displaying such content represented by service information of a VOD broadcasting on a display of a bidirectional remote controller at hand in an easy-to-see manner to enable various settings even while a general broadcast program is being watched.

A CATV system according to one aspect of the present invention is directed to a CATV system, comprising a digital broadcasting transmitting unit for multiplexing content exclusively used for remote controller in addition to contents of broadcast programs and transmitting the multiplexed contents; a digital broadcasting receiving unit for receiving the contents transmitted from the digital broadcasting transmitting unit; a television receiver for displaying the contents received by the digital broadcasting receiving unit; and a bidirectional remote controller capable of communicating with the digital broadcasting receiving unit, wherein the digital broadcasting receiving unit includes a separating device for separating the multiplexed contents from the digital broadcasting transmitting unit into the contents of the broadcast programs and the content exclusively used for remote controller, a transmitter for transmitting the contents of the broadcast programs separated by the separating device to the television receiver, and a communicator for transmitting the content exclusively used for remote controller separated by the separating device to the bidirectional remote controller; the television receiver includes a display for displaying the contents of the broadcast programs transmitted from the transmitter; and the bidirectional remote controller includes a display for displaying the content exclusively used for remote controller transmitted from the communicator.

Since the content exclusively used for remote controller is displayed on the display of the remote controller in an easy-to-see manner in this CATV system, if the content exclusively used for remote controller is configured by arranging main information of service information of a video-on-demand broadcasting (VOD broadcasting), the content or the like can be easily understood to enable various settings by seeing the content exclusively used for remote controller displayed within the display of the bidirectional remote controller at hand in an easy-to-see manner without displaying the service information of the VOD broadcasting within the display screen of the television receiver even while a user is watching a general program.

DETAILED DESCRIPTION OF THE PREFERRED EMBODIMENTS OF THE INVENTION

Hereinafter, embodiments of the present invention are described with reference to FIGS. 1 to 4.

First Embodiment

Figure 1:
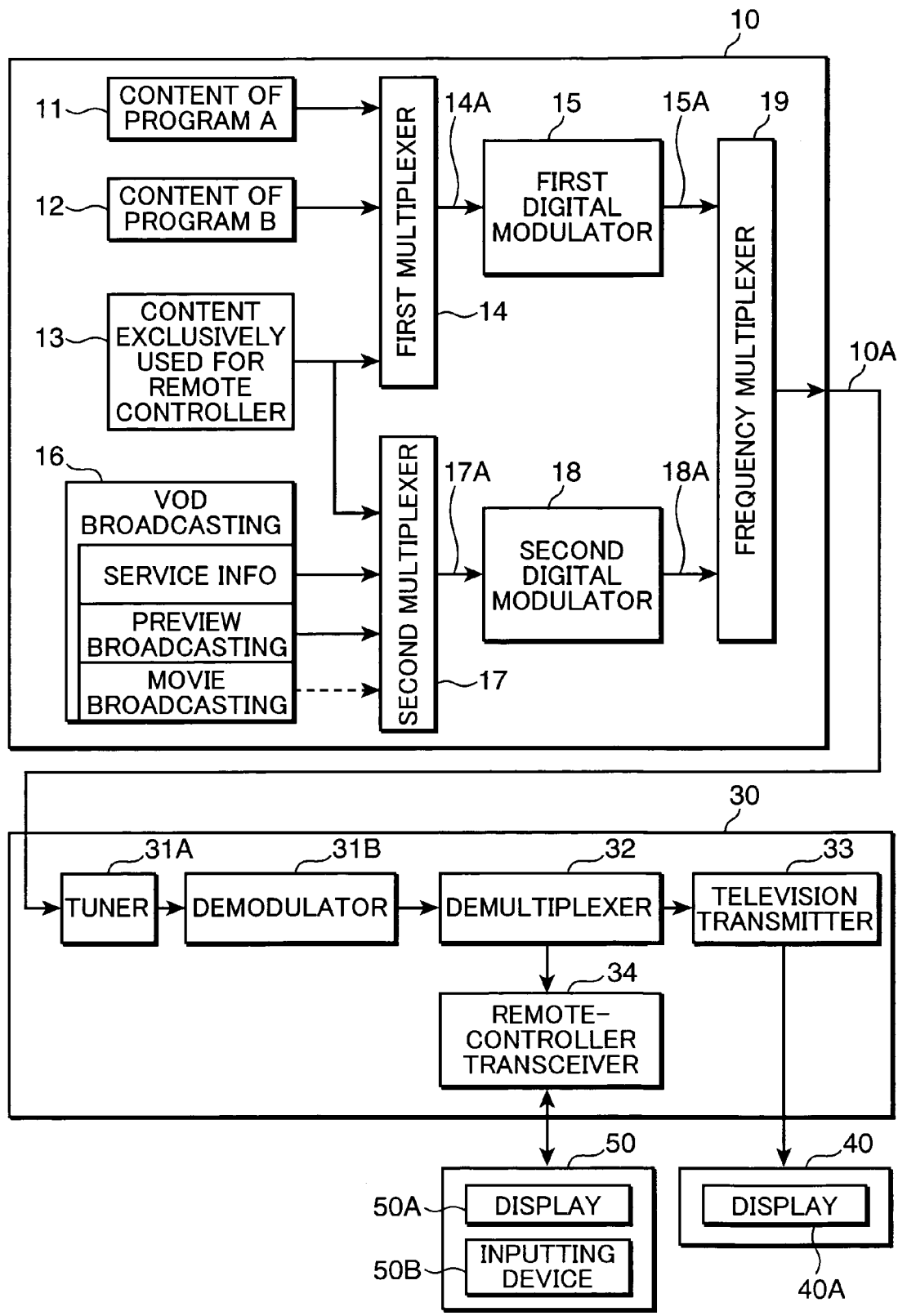
FIG. 1 is a block diagram showing a construction of a CATV system according to a first embodiment of the invention.

First, a CATV system according to a first embodiment of the present invention is described. FIG. 1 is a block diagram showing a construction of the CATV system according to the first embodiment of the invention. The CATV system shown in FIG. 1 is provided with a digital broadcasting transmitting unit 10, a CATV system transmission line 10A, a digital broadcasting receiving unit 30 (hereinafter, "STB 30"), a television receiver 40 and a bidirectional remote controller 50.

The digital broadcasting transmitting unit 10 is provided with first and second multiplexers 14, 17 to which content 11 of a program A which is a general broadcast program, content 12 of a program B which is likewise a general broadcast program, content 13 exclusively used for remote controller, and a video-on-demand broadcasting 16 (hereinafter, "VOD broadcasting 16") are inputted in specified combinations; first and second digital modulators 15, 18 to which first and second transport streams 14A, 17A as outputs of the respective multiplexers 14, 17 are inputted; and a frequency multiplexer 19 to which carrier waves 15A, 18A are inputted from the first and second digital modulators 15, 18.

The STB 30 is provided with a tuner 31A, a demodulator 31B, a demultiplexer 32, a television transmitter 33 and a remote-controller transceiver 34. The television receiver 40 includes a display 40A, and the bidirectional remote controller 50 includes a display 50A and an inputting device 50B.

This embodiment largely differs from the prior art CATV system in that a plurality of contents including the content 13 exclusively used for remote controller are transmitted from the digital broadcasting transmitting unit 10, and the content 13 exclusively used for remote controller has a smaller data capacity than the contents 11, 12 of the respective programs.

Hereinafter, the operation of the CATV system of this embodiment is described with respect to an exemplary case where the content 13 exclusively used for remote controller includes a simpler data configured by extracting an essential portion from service information (list of titles of movies, what's new information of movies, screen used to purchase the movie, etc.) of the VOD broadcasting 16.

First, the contents 11, 12 of the programs A, B, which are general broadcast programs, and the content 13 exclusively used for remote controller are multiplexed in the first multiplexer 14, thereby producing the first transport stream 14A of one channel. The first transport stream 14A is inputted to the first digital modulator 15 to be modulated, and the first carrier wave 15A corresponding to the first transport stream 14A is inputted to the frequency multiplexer 19.

Similarly, the VOD broadcasting 16, which is a pay-TV program, and the content 13 exclusively used for remote controller are multiplexed in the second multiplexer 17, thereby producing the second transport stream 17A of one channel. The second transport stream 17A is inputted to the second digital modulator 18 to be modulated, and the second carrier wave 18A corresponding to the second transport stream 17A is inputted to the frequency multiplexer 19 similar to the first carrier wave 15A.

As described above, the content 13 exclusively used for remote controller has a simple data configuration mainly containing text information obtained by processing the service information set to watch the VOD broadcasting.

The two carrier waves 15A, 18A are multiplexed in the frequency multiplexer 19, and the multiplexed carrier waves of two channels are transmitted from the digital broadcasting transmitting unit 10 via the CATV transmission line 10A.

In the STB 30, the signal transmitted from the digital broadcasting transmitting unit 10 is received by the tuner 31A, and the carrier wave is selected in the tuner 31A and demodulated in the demodulator 31B, thereby obtaining a transport stream of one channel.

Further, the obtained transport stream of one channel is separated according to the contents in the demultiplexer 32, and the separated contents are respectively transmitted to the television transmitter 33 and the remote-controller transceiver 34 according to the contents. The television receiver 40 and the bidirectional remote controller 50 display the received contents on the respective displays 40A, 50A.

At this time, if the bidirectional remote controller 50 is operated to give an instruction to select the program A to the STB 30, the frequency of the carrier wave 15A corresponding to the channel of the transport stream 14A is selected in the tuner 31A of the STB 30 and the selected carrier wave 15A is demodulated in the demodulator 31B. The content 11 of the program A separated in the demultiplexer 32 is sent to the television transmitter 33, whereas the content 13 exclusively used for remote controller is sent to the remote-controller transceiver 34.

At this time, the content 11 of the desired program A is transmitted from the television transmitter 33, and the program A can be watched on the display 40A of the television receiver 40. On the other hand, the content 13 exclusively used for remote controller is sent to the remote-controller transceiver 34, which then transmits it to the bidirectional remote controller 50. Thus, a content corresponding to the service information of the VOD broadcasting 16 not related to the program A can be displayed on the display 50A of the bidirectional remote controller 50.

Here, since the content 13 exclusively used for remote controller has a simpler data configuration corresponding to the display 50A of the bidirectional remote controller 50, it is easy to visually confirm and understand the content. Accordingly, the viewer can easily confirm the content of the service information of the VOD broadcasting 16 displayed on the display 50A of the bidirectional remote controller 50 without switching the display screen of the television receiver 40 even while watching the program A on the television receiver 40.

No operation is required in the case that that the viewer continues to watch the program A on the television receiver 40 thereafter. However, if discovering a movie he wants to watch instead of the program A, the viewer keeps changing the content on the display 50A of the bidirectional remote controller 50 while carrying out a specified operation by means of the input device 50B of the bidirectional remote controller 50, and applies for purchase on a charging screen for the movie wished to watch.

Since the content displayed on the display 50A of the bidirectional remote controller 50 is also configured as the content 13 exclusively used for remote controller and is displayed in an easy-to-see manner, operability is improved due to easy visual confirmation.

A purchase application signal from the bidirectional remote controller 50 is received by the remote-controller transceiver 34, which then transmits it up to a distributor (not shown) of the VOD broadcasting 16 via the STB 30, a controller (not shown) of the digital broadcasting transmitting unit 10 and the like, whereby the transmission of the desired movie broadcasting is started. Upon the purchase application for the desired movie by means of the bidirectional remote controller 50 A, a controller (not shown) of the STB 30 for discriminating the signal switches the tuner 31A to a channel corresponding to the VOD broadcasting 16.

The desired movie broadcasting is transmitted to the second multiplexer 17 of the digital broadcasting transmitting unit 10 to be multiplexed with the content 13 exclusively used for remote controller into the second transport stream 17A. The resultant signal is processed in the digital broadcasting transmitting unit 10 and the STB 30 similar to the above and transmitted from the television transmitter 33 of the STB 30, so that the desired movie can be watched on the display 40A of the television receiver 40.

As described above, this embodiment is convenient to handle by enabling the content to be easily visually confirmed for specified setting and the like only within the display 50A of the bidirectional remote controller 50 without switching the display screen of the television receiver 40 being watched to the screen corresponding to the VOD broadcasting 16 or the like.

If the data capacity of the content 13 exclusively used for remote controller is set to be smaller than the content of the normal broadcast program as described above, a communication time between the bidirectional remote controller 50 and the STB 30 can be shortened. Thus, the transceivers of the bidirectional remote controller 50 and the STB 30 do not need to have a high communication speed and are allowed to have simple constructions. In addition, the digital broadcasting transmitting unit 10 can more easily multiplex signals if the data capacity of the content 13 exclusively used for remote controller is smaller.

Although the setting is carried out with the program A being displayed on the television receiver 40 in the above description, the inputting device 50B of the bidirectional remote controller 50 may be operated to switch the screen of the display 40A of the television receiver 40 to a channel corresponding to the VOD broadcasting 16 when the content 13 exclusively used for remote controller displayed on the display 50A of the bidirectional remote controller 50 is confirmed and, then, the succeeding setting may be carried out.

In such a case, the tuner 31A of the STB 30 selects the carrier wave 18A corresponding to the channel of the transport stream 17A through the operation of the bidirectional remote controller 50, and the demultiplexer 32 sends the service information and the preview broadcasting of the demultiplexed VOD broadcasting 16 to the television transmitter 33, thereby causing them to be displayed on the display 40A of the television receiver 40.

Since the second transport stream 17A is multiplexed to contain the content 13 exclusively used for remote controller, the content 13 exclusively used for remote controller is transmitted from the STB 30 to the bidirectional remote controller 50 even if the above operation is carried out. If necessary, the display on the display 50A of the bidirectional remote controller 50 may stopped upon the above operation.

The viewer can purchase the broadcasting of the desired movie by an operation similar to the above while confirming the content displayed on the display 40A of the television receiver 40 or on the display 50A of the bidirectional remote controller 50.

In this operating state, the CATV system is used as in the case of the prior art CATV system. However, since the content corresponding to the service information of the VOD broadcasting 16 is displayed on the display 50A of the bidirectional remote controller 50 in an easier-to-see manner as compared to the prior art CATV system, the switch to the screen of the television receiver 40 can be immediately judged.

In the case of a data broadcasting service represented by the EPG or the like, it is, at present, that the broadcast program being watched is displayed in reduced size on a picture-in-picture screen and the EPG is largely displayed on the remaining part of the screen in many cases when the EGP is displayed on the display 40A of the television receiver 40. Even for such cases, if the EPG or the like is configured to be transmitted, for example, as the content 13 exclusively used for remote controller, the EPG or the like can be displayed only within the display 50A of the bidirectional remote controller 50 at hand without hindering the content on the screen of the television receiver 40 being watched.

As described above, in the CATV system of this embodiment, the contents including the content 13 exclusively used for remote controller prepared beforehand are multiplexed in and transmitted from the digital broadcasting transmitting unit 10. Thus, even if a general program is being watched on the television receiver 40 via the STB 30, the content 13 exclusively used for remote controller including the service information of the VOD broadcasting 16 and the like can be displayed in an easy-to-see manner on the display 50A of the bidirectional remote controller 50 at hand.

Therefore, the viewer can easily judge the content displayed on the display 50A of the bidirectional remote controller 50 without switching the display content of the television receiver 40, and can conveniently carry out various settings by means of the bidirectional remote controller 50 if necessary.

Second Embodiment

Figure 2:
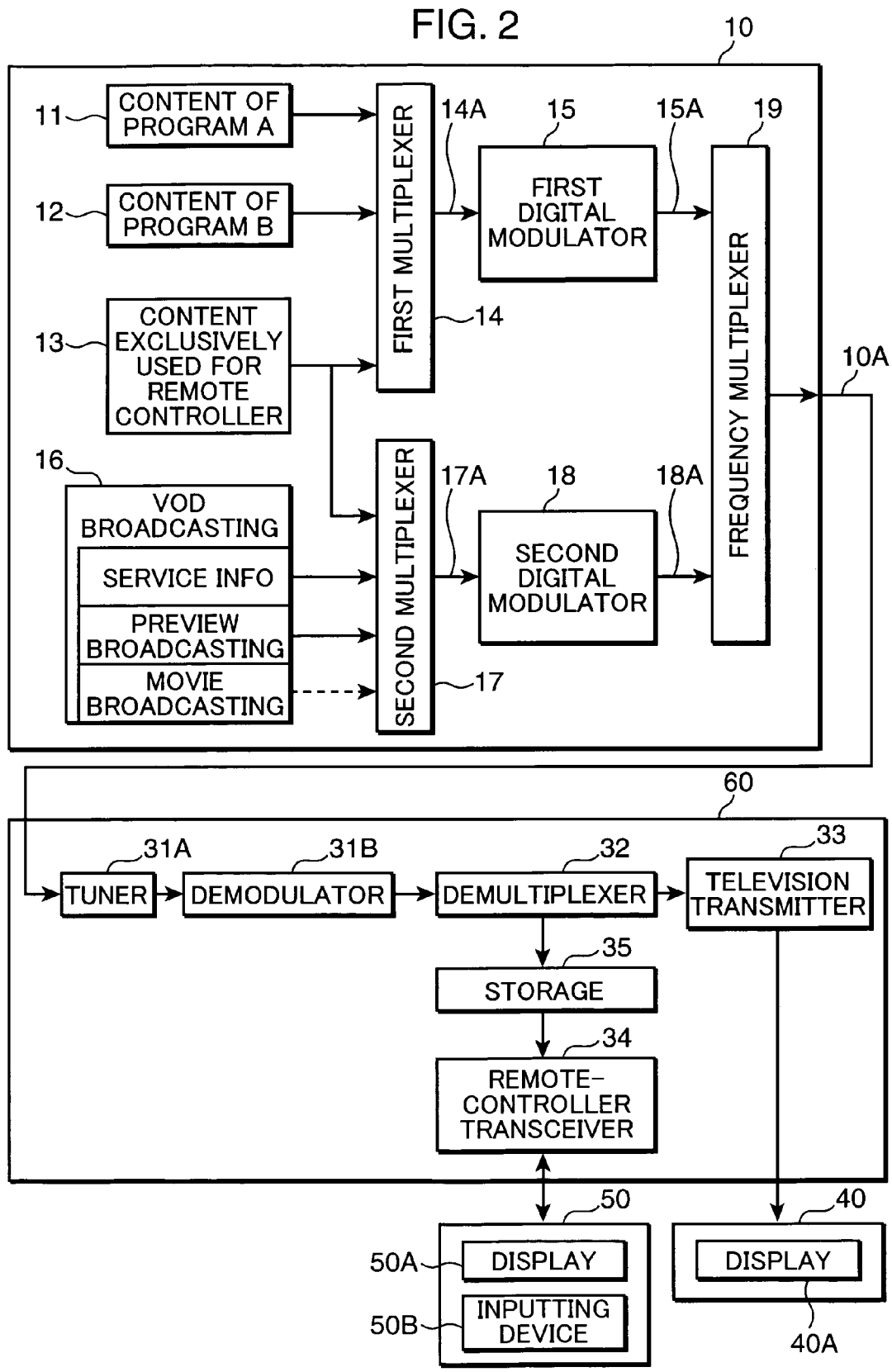
FIG. 2 is a block diagram showing a construction of a CATV system according to a second embodiment of the invention.

Next, a CATV system according to a second embodiment of the present invention is described. FIG. 2 is a block diagram showing a construction of the CATV system according to the second embodiment. It should be noted that no detailed description is given on the same construction as the first embodiment by identifying it by the same reference numerals.

The CATV system shown in FIG. 2 differs from the one according to the first embodiment in the construction of a digital broadcasting receiving unit 60 (hereinafter, "STB 60"). The STB 60 is internally provided with a storage 35 in addition to a tuner 31A, a demodulator 31B, a demultiplexer 32, a television transmitter 33 and a remote-controller transceiver 34 similar to the first embodiment. The storage 35 may be for common use with other function.

The remaining elements, i.e., a digital broadcasting transmitting unit 10, a CATV transmission line 10A, a television receiver 40 and a bidirectional remote controller 50, are same as those of the first embodiment. Since operation contents of the digital broadcasting transmitting unit 10 of the CATV system according to this embodiment are same as in the first embodiment, no description is given thereon.

In the STB 60, a signal from the digital broadcasting transmitting unit 10 inputted via the CATV transmission line 10A is received by the receiver 31A to have a carrier wave selected, and the selected carrier wave is demodulated in the demodulator 31B, thereby obtaining a transport stream of one channel. The obtained transport stream is separated into the respective contents in the demultiplexer 32. Further, similar to the first embodiment, a content of a desired broadcast program is sent to the television transmitter 33 and can be watched on the display 40A of the television receiver 40.

On the other hand, a content 13 exclusively used for remote controller is sent to the remote-controller transceiver 34 via the storage 35. When a viewer confirms the content 13 exclusively used for remote controller, a specified operation is made to the inputting device 50B of the bidirectional remote controller 50 to read the content saved in the storage 35 and to send a transmission request to the remote-controller transceiver 34.

In this way, the content 13 exclusively used for remote controller saved in the storage 35 can be sent to the remote-controller transceiver 34 and transmitted therefrom by the control of a controller (not shown) of the STB 60, and is displayed on the display 50A of the bidirectional remote controller 50.

The content 13 exclusively used for remote controller may be saved in the storage 35 and, at the same time, this signal may be sent to the remote-controller transceiver 34 to be transmitted. Further, it is also possible to immediately read the content saved in the storage 35, i.e., the content 13 exclusively used for remote controller, to transmit it to the bidirectional remote controller 50 and to display it on the display 50A when the STB 60 is turned on.

Since the content 13 exclusively used for remote controller is configured to have a small data capacity, a capacity of the storage 35 does not need to be particularly large. It is also possible to accumulate the content 13 exclusively used for remote controller little by little. In such a case, the saved content can be confirmed at any desired time after the little-by-little accumulation of the content 13 exclusively used for remote controller in the storage 35 is completed.

As described above, this embodiment enables the content 13 exclusively used for remote controller saved in the storage 35 of the STB 60 to be displayed on the display 50A of the bidirectional remote controller 50 at any desired time upon a transmission request from the bidirectional remote controller 50 and, hence, is very convenient.

Third Embodiment

Figure 3:
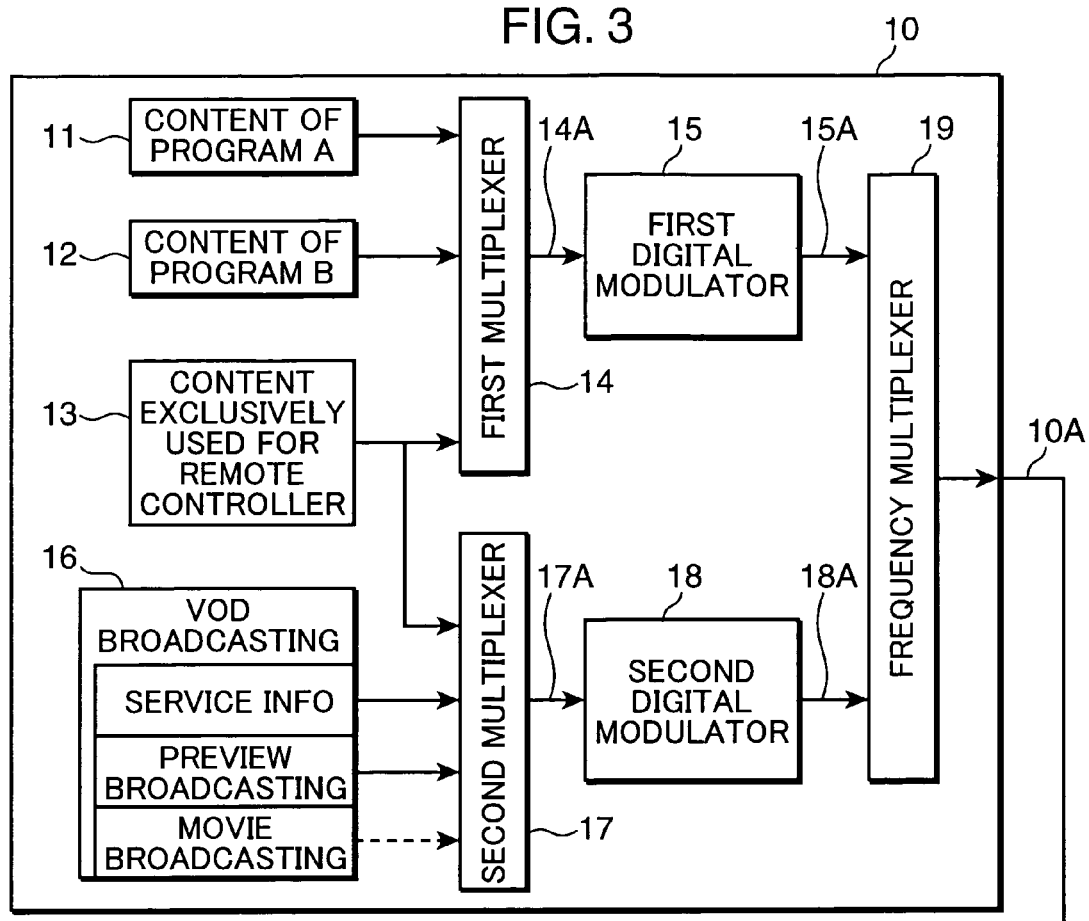
FIG. 3 is a block diagram showing a construction of a CATV system according to a third embodiment of the invention.
Figure 3:
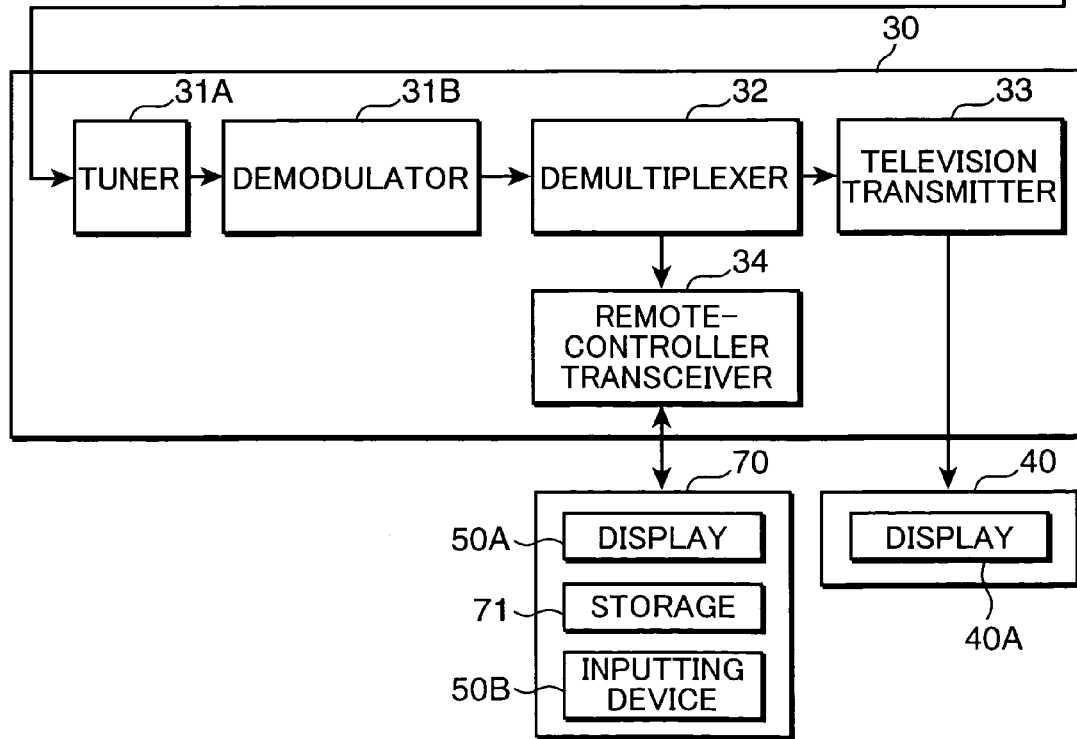

Next, a CATV system according to a third embodiment of the present invention is described. FIG. 3 is a block diagram showing a construction of the CATV system according to the third embodiment. It should be noted that no detailed description is given on the same construction as the first embodiment by identifying it by the same reference numerals.

The CATV system shown in FIG. 3 differs from the one according to the first embodiment in the construction of a bidirectional remote controller 70. The bidirectional remote controller 70 includes a storage 71 in addition to a display 50A and an inputting device 50B.

The remaining elements, i.e., a digital broadcasting transmitting unit 10, a CATV transmission line 10A, a television receiver 40 and a bidirectional remote controller 50, are same as those of the first embodiment. Since operations of the digital broadcasting transmitting unit 10, the STB 30 and the television receiver 40 of the CATV system according to this embodiment are same as in the first embodiment, no description is given thereon.

In this embodiment, the bidirectional remote controller 70 is constructed to be capable of receiving a content 13 exclusively used for remote controller transmitted from a remote-controller transceiver 34 of the STB 30 and saving it in the storage 71. The content 13 exclusively used for remote controller saved in the bidirectional remote controller 70 is read from the storage 71 by operating the inputting device 50B, and the content 13 exclusively used for remote controller is displayed on the display 50A.

As described above, in this embodiment, even if the STB 30 is off, the content 13 exclusively used for remote controller saved in the storage 71 can be displayed on the display 50A upon occasion by carrying out a specified operation by means of the inputting device 50B using only the bidirectional remote controller 70.

Fourth Embodiment

Figure 4:
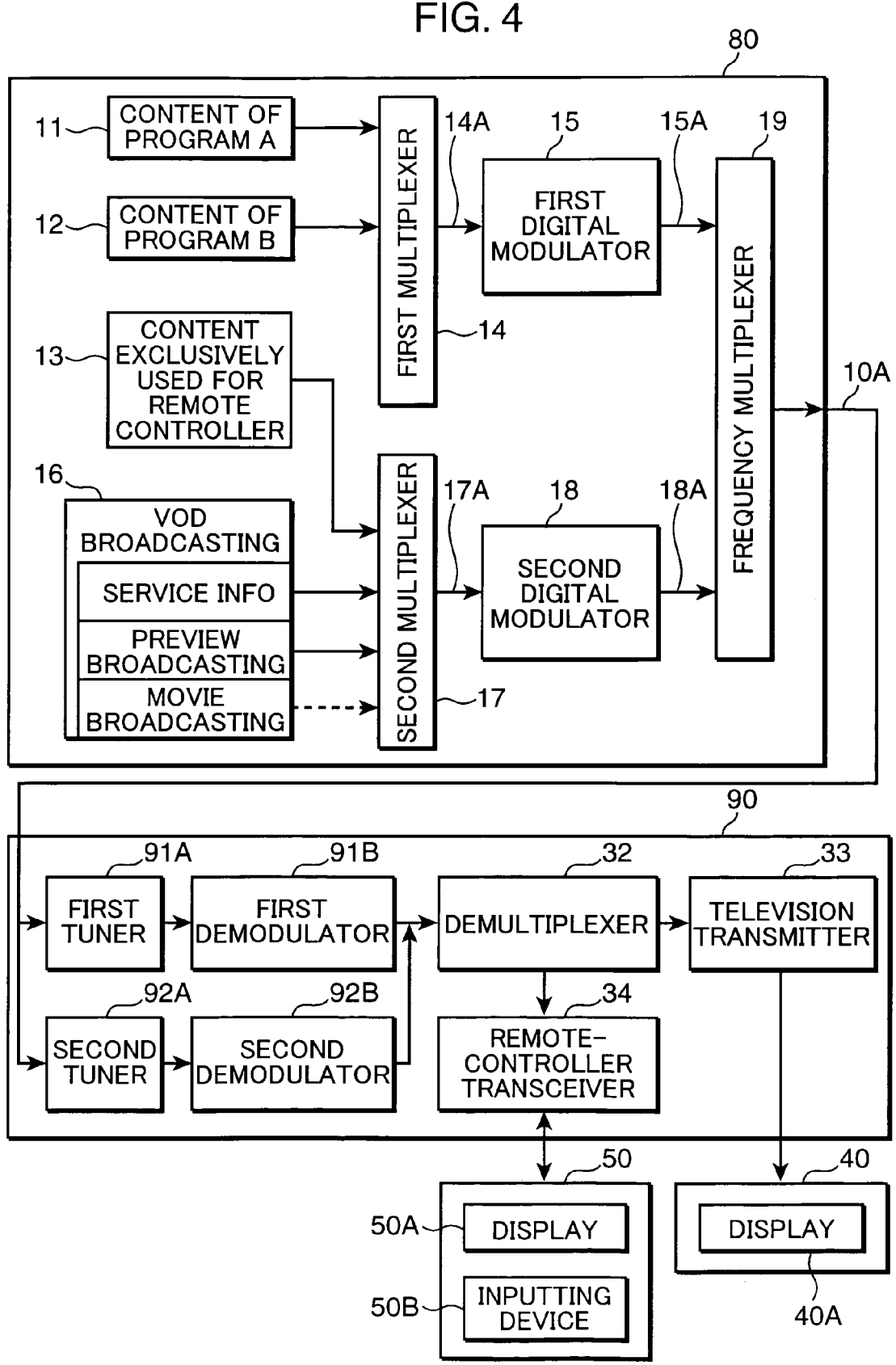
FIG. 4 is a block diagram showing a construction of a CATV system according to a fourth embodiment of the invention.
Figure 5:
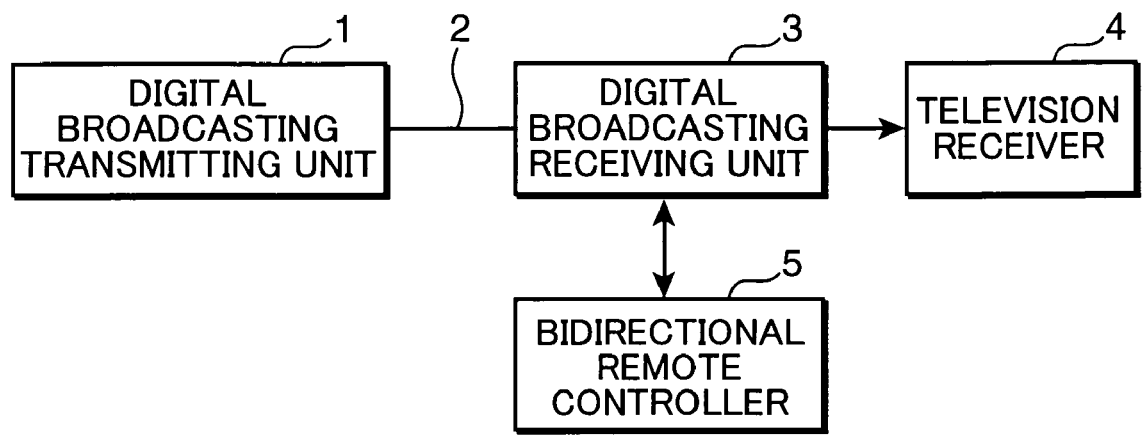
FIG. 5 is a block diagram showing a construction of a prior art CATV system.

Next, a CATV system according to a fourth embodiment of the present invention is described. FIG. 4 is a block diagram showing a construction of the CATV system according to the fourth embodiment. It should be noted that no detailed description is given on the same construction as the first embodiment by identifying it by the same reference numerals.

The CATV system shown in FIG. 4 differs from the one according to the first embodiment in that content 13 exclusively used for remote controller is sent only to a second multiplexer 17 in a digital broadcasting transmitting unit 80 to be multiplexed. In other words, the content 13 exclusively used for remote controller is multiplexed only into a second transport stream 17A, but not into a first transport stream 14A.

Similar to the first embodiment, the respective transport streams 14A, 17A are modulated in corresponding digital modulators 15, 18 to become carrier waves 15A, 18A, which are further multiplexed in a frequency multiplexer 19. The resulting carrier waves of two channels are transmitted from the digital broadcasting transmitting unit 80.

On the other hand, a digital broadcasting receiving unit 90 (hereinafter, "STB 90") has a construction different from that of the first embodiment and is provided with a plurality of tuning functions and a plurality of demodulating functions. In the following description, two tuning functions and two demodulating functions of the STB 90 are arranged in parallel as shown in FIG. 4.

As shown in FIG. 4, the signal transmitted from the digital broadcasting transmitting unit 80 is simultaneously received by a first and a second tuners 91A, 92A of the STB 90. At this time, the frequency of the carrier wave 15A corresponding to a channel of the transport stream 14A is selected in the first tuner 91A, and the selected carrier wave 15A is demodulated in a first demodulator 91B and inputted to a demultiplexer 32.

Further, the frequency of the carrier wave 18A corresponding to a channel of the transport stream 17A is selected in the second tuner 92A and the selected carrier wave 18A is demodulated in a second demodulator 92B and inputted to the demultiplexer 32.

These two demodulated signals are separated according to the contents in the demultiplexer 32, whereupon the content 13 exclusively used for remote controller is sent to a remote-controller transceiver 34 and a desired one of the remaining contents is sent to a television transmitter 33, and the respective contents are transmitted to a bidirectional remote controller 50 and a television receiver 40 to be displayed on the corresponding displays 50A and 40A.

As described above, in this embodiment, the content 13 exclusively used for remote controller can be displayed only on the display 50A of the bidirectional remote controller 50 while a general broadcast program is being watched on the television receiver 40, and a viewer can carry out operations for various settings and the like while visually confirming the content displayed on the display 50A of the bidirectional remote controller 50 at hand without switching the display content of the television receiver 40.

In the case of provided the STB 90 with a plurality of tuning functions and a plurality of demodulating functions, the content 13 exclusively used for remote controller can be constantly displayed on the display 50A of the bidirectional remote controller 50 if one pair of the tuning function and the demodulating function are so set as to select and demodulate the signal containing the content 13 exclusively used for remote controller. In such a case, it is not necessary to multiplex each carrier wave to contain the content 13 exclusively used for remote controller. Thus, there is no redundancy of the content 13 exclusively used for remote controller during the multiplexing in the digital broadcasting transmitting unit 80. This feature is particularly useful in the digital broadcasting transmitting unit 80.

The contents 13 exclusively used for remote controller according to the respective embodiments may contain only character information, only image information such as moving images or still images, or a combination of the character information and the image information. In other words, any information will do provided that it can be displayed on the displays of the corresponding remote controllers in an easily visually confirmable manner.

This application is based on Japanese patent application serial No. 2004-2721, filed in Japan Patent Office on Jan. 8, 2004, the contents of which are hereby incorporated by reference.

Although the present invention has been fully described by way of example with reference to the accompanied drawings, it is to be understood that various changes and modifications will be apparent to those skilled in the art. Therefore, unless such changes and modifications depart from the scope of the present invention hereinafter defined, they should be construed as being included therein.

The invention claimed is:

1. A CATV system comprising:
   a digital broadcasting transmitting unit for multiplexing content exclusively used for remote controller and contents of broadcast programs, and transmitting the multiplexed contents;
   a digital broadcasting receiving unit for receiving the multiplexed contents transmitted from the digital broadcasting transmitting unit;
   a television receiver for displaying contents received by the digital broadcasting receiving unit; and
   a bidirectional remote controller operable to communicate with the digital broadcasting receiving unit, wherein
   the digital broadcasting receiving unit includes:
      a separating device for separating the multiplexed contents from the digital broadcasting transmitting unit into the contents of the broadcast programs and the content exclusively used for remote controller;
      a transmitter for transmitting the contents of the broadcast programs separated by the separating device to the television receiver; and
      a communicator for transmitting the content exclusively used for remote controller separated by the separating device to the bidirectional remote controller,
   the television receiver includes a display for displaying the contents of the broadcast programs transmitted from the transmitter,
   the bidirectional remote controller includes a display for displaying the content exclusively used for remote controller transmitted from the communicator, and
   the digital broadcasting transmitting unit includes:
      a first multiplexer for multiplexing the content exclusively used for remote controller which does not contain service information related to general broadcast programs and contains service information set to watch pay-TV programs not related to general broadcast programs and transmitted by the CATV system, and information for displaying a screen used to purchase pay-TV programs on the display of the bidirectional remote control, and contents of general broadcast programs, and outputting a first transport stream of one channel;
      a second multiplexer for multiplexing the content exclusively used for remote controller and contents of pay-TV programs, and outputting a second transport stream of one channel;
      a first digital modulator for modulating the first transport stream outputted from the first multiplexer and outputting a first carrier wave corresponding to the first transport stream;
      a second digital modulator for modulating the second transport stream outputted from the second multiplexer and outputting a second carrier wave corresponding to the second transport stream; and
      a frequency multiplexer for multiplexing the first and second carrier waves outputted from the first and second digital modulators and transmitting a multiplexed signal of the multiplexed contents to the digital broadcasting receiving unit.

2. A CATV system according to claim 1, wherein the digital broadcasting receiving unit further includes a storage for saving the content exclusively used for remote controller separated by the separating device.

3. A CATV system according to claim 2, wherein the communicator reads and transmits the content exclusively used for remote controller saved in the storage to the bidirectional remote controller with a time delay from a time of reception from the digital broadcasting transmitting unit.

4. A CATV system according to claim 2, wherein the communicator reads and transmits the content exclusively used for remote controller saved in the storage to the bidirectional remote controller when the digital broadcasting receiving unit is turned on.

5. A CATV system according to claim 1, wherein the bidirectional remote controller further includes a storage for saving the content exclusively used for remote controller separated by the separating device.

6. A CATV system according to claim 5, wherein the bidirectional remote controller displays the content exclusively used for remote controller saved in the storage on the display with a time delay after a time of reception.

7. A CATV system according to claim 1, wherein the digital broadcasting receiving unit further includes a plurality of tuners, and one of the plurality of tuners is operable to select a signal of a frequency containing the content exclusively used for remote controller from the multiplexed signal from the digital broadcasting transmitting unit and transmit the selected signal to the separating device.

8. A CATV system according to claim 1, wherein a data capacity of the content exclusively used for remote controller transmitted from the digital broadcasting transmitting unit is smaller than that of the contents of the broadcast programs.

9. A CATV system according to claim 8, wherein the data capacity of the content exclusively used for remote controller is smaller than that of the contents of general broadcast programs.

10. A CATV system according to claim 9, wherein the content exclusively used for remote controller transmitted from the digital broadcasting transmitting unit contains information comprising text data as the service information.

11. A CATV system according to claim 1, wherein the content exclusively used for remote controller transmitted from the digital broadcasting transmitting unit contains electronic program guide information, and a data capacity of the content exclusively used for remote controller is smaller than that of contents of the general broadcast programs.

12. A CATV according to claim 1, wherein the digital broadcasting receiving unit includes a tuner for selecting a carrier wave from the multiplexed signal transmitted from the digital broadcasting transmitting unit, and the bidirectional remote controller does not display the service information contained in the content exclusively used for remote controller on the display if the second carrier wave is selected by the tuner and the service information of the pay-TV programs is displayed on the display of the television receiver.

* * * * *